July 10, 1928.

A. J. DOTTERWEICH 1,676,532

APPARATUS FOR TREATING WATER

Filed Dec. 24, 1924

WITNESS
J. Herbah Bradley.

INVENTOR
Andrew J. Dotterweich
by Dennis L. Wolcott
Atty

Patented July 10, 1928.

1,676,532

UNITED STATES PATENT OFFICE.

ANDREW J. DOTTERWEICH, OF PITTSBURGH, PENNSYLVANIA.

APPARATUS FOR TREATING WATER.

Application filed December 24, 1924. Serial No. 757,912.

Experience has shown that in the operation of water softening apparatus employing material such as glauconite, whereby an exchange is effected, the hardening salts of the water, as calcium and magnesium, being exchanged for the sodium of the sand, efficiency is dependent upon the thoroughness of such exchange and also with the thoroughness effected in the revivifying operation, wherein the salts of calcium and magnesium are exchanged for the sodium salts in the brine. Hence, it is desirable that the hard water during the softening operation and the brine in the revivifying operation should contact with all the grains or particles of glauconite, and also that all portions of the mass of material should be uniformly permeable to avoid loss of time during the exchange operations. Experience has shown that during the softening operation, there will be such a compacting of the material that when the water is reversed and caused to flow upwardly for backwashing, the whole mass will move upwardly and in the upwardly flowing streams or jets of water, will impinge with greater or less force against the underside of the raised mass. As the coherence of the particles or grains of sand is not uniform throughout the mass, the water will flow up at unequal rates through the mass, and the material will drop in lumps which will be subsequently only partially disintegrated, and hence a considerable proportion of the material will not be revivified and will be ineffective during the subsequent softening operation.

Experience has also shown that if the rate of flow of water up through the material for revivifying is high, some of the material will be carried out of the treating tank. And further, the brine and water must be in contact with the material for an appreciable time to effect the exchange, and hence if the rate of flow of the brine is high, it will require a greater quantity to flow through the tank to effect complete revivifying action. On the other hand, if the flow of water during the softening operation is too fast, there will not be a thorough elimination of the hardening salts.

It is an object of the invention described herein to provide such a bonding of the material when raised by the reverse flow of water at the beginning of the backwashing operation, that only detached grains or small lumps can descend to normal position. It is a further object of the invention to provide an indicator showing the rate of flow of water during the several operations. The invention is hereinafter more fully described and claimed.

Figure 1:
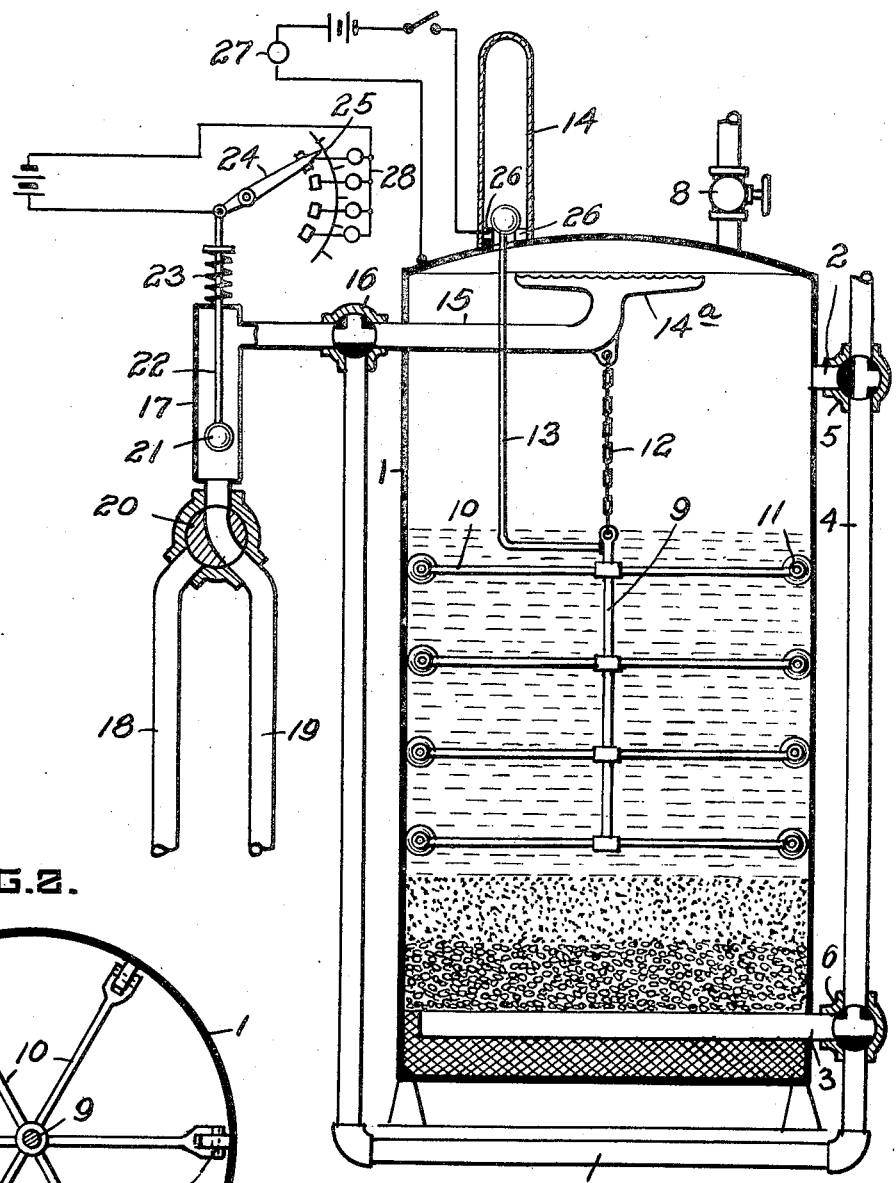
Figure 2:
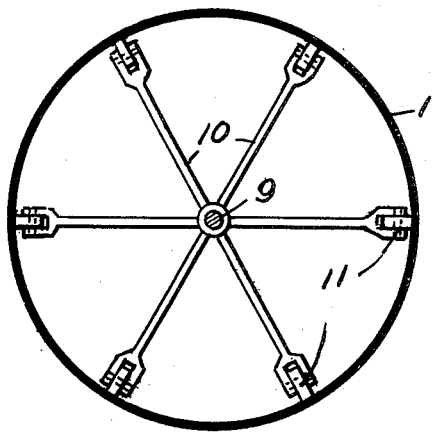

In the accompanying drawings forming a part of this specification, Fig. 1 is a sectional elevation of a tank containing water softening material and having combined therewith the improvement hereinafter described and claimed; and Fig. 2 is a sectional plan view illustrating a form of the material bonding element.

In the practice of the invention the tank 1 is charged to a suitable depth with filtering material, as sand and gravel, and on the body of filtering material is charged a body consisting of granulated revivifying material as glauconite. The tank is provided at points above the treating material and below the filtering material with nozzles 2 and 3 adapted to be connected to a pipe 4 extending from the supply of water to be treated. At the junction of the pipe 4 with the upper nozzle is placed a two-way valve 5 adapted to direct the water alternately through the nozzle 2 into the tank or to the lower nozzle 3, and at the junction of the pipe 4 with the nozzle 3 is arranged a two-way valve 6 adapted to permit water from the supply to flow into the lower portion of the tank or through a pipe 7 leading to the point of use. Means are employed for introducing brine into the tank at a point above the level of the revivifying material in the tank, such as the nozzle 8.

In the tank is arranged a frame extending from a level adjacent to the upper surface of the filtering bed to or above the body of revivifying material. This frame is provided with a plurality of horizontal elements connected to a vertical member. These horizontal members are spaced apart vertically and extend horizontally through the mass of treating material and operate as bonds. The bonding elements are spaced such distances apart as to prevent lumps of any considerable size passing down between them, but will not interfere with the downward movement of the grains or small lumps. A desirable construction of bonding and supporting frame consists of a vertical rod 9 and horizontal arms 10 which preferably extend to the sides of the tank and are provided at their ends with rollers 11 bearing on the wall of the tank. This frame can be placed in the tank prior to charging in the treating material or at any time as the grains of treating material are so mobile except during the latter part of the softening period that the frame will sink down into the material. To prevent the lower portion of the frame from becoming imbedded in the filtering material, means are provided to limit its downward movement. In the construction shown, a chain 12 is connected to the vertical member and to some suitable portion of the tank. During the softening operation the grains of treating material are caused to cohere so as to form a comparatively compact mass in which the frame is imbedded. When water is admitted below the mass for backwashing, the mass will be forced upwardly and held in such position by the upwardly flowing streams or jets of water until disintegration has been effected. If during disintegration, lumps become loosened or detached from the mass, they will be supported by the frame until wholly disintegrated.

As the material, as disintegrated, will be agitated by the upwardly flowing water, the frame will automatically settle down as soon as the mass is so broken up as to be no longer capable of supporting the frame.

In order to enable the operator to ascertain the position of the frame and thereby the extent of disintegration of the material, a rod 13 is so secured to the frame as to project up into a glass shell 14 secured to the top of the tank.

During the backwashing, water flows from the tank through a basin or spreader 14ª provided with a pipe 15 extending out of the tank and during salting, flushing, and softening operations, the flow of water is from the lower end of the tank through pipe 7. The pipes 7 and 15 are connected to a two-way valve 16 which is also connected to the upper end of the shell 17. The lower end of the shell is connected by a pipe 18 to a drain and to the point of use of the softened water by a pipe 19, the connection of these pipes with the shell being controlled by a valve 20. Within the shell 17 is arranged a head or piston 21 having a stem 22 projecting upwardly from the shell. The piston is yieldingly supported on the shell by a spring 23. The head or piston is made of such diameter relative to that of the shell that although not materially checking the flow of water through the shell, it will shift the head against the tension of the spring a distance proportional to the rate of flow of water from the tank. To the stem is attached a pointer 24 that will move along a plate 25 provided with marks so located as to indicate the proper rate of flow of water for the several operations. For a given size of softening apparatus the flow of water for backwashing should be at the rate of about six gallons per square foot of material in the tank per minute, in order to properly disintegrate the mass of material as described and ensure the revivifying of the sand in the desired period and without carrying the material from the tank. For salting, the rate of flow should be about two gallons per square foot of material in tank per minute; for flushing, about three gallons per minute; and for softening, about six gallons per square foot of material in tank per minute. The indicating apparatus is so constructed and adjusted that the movement of the head or piston 21 will be proportional to the respective rates of flow and hence the operator can easily ascertain the necessary adjustment of the valves 5 and 6 controlling the flow of water through the tank.

Where it is desired to employ indicators as to the several operations described, at a distance from the treating tank, the ball on the rod 13 may be employed to connect contact points 26, said contacts forming parts of a circuit including a lamp 27 or other signal. It is preferred that the circuit shown should include a switch which can be closed when an indicator is desired as regards back washing.

In order to give indication regarding the rate of flow of water during salting, flushing and softening, different colored lamps 28 are included in circuits controlled by the movement of the head or piston 21.

I claim herein as my invention:

1. In apparatus adapted to treat water by passage through a mass of treating material contained in a tank, said treating material being normally granular but adapted to become caked by use and requiring washing to restore it to granular condition, the combination with such a tank of means to admit wash water to the bottom of the tank and to draw it off at the top, an internal member adapted to be embedded in the granular treating material and to rise therewith after caking thereof upon admission of wash water below the cake of treating material, and an external visible member adapted to rise with said internal member, whereby to indicate the position of said treating material relative to the tank.

2. In apparatus adapted to treat water by passage through a mass of treating material contained in a tank, said treating material being normally granular but adapted to become caked by use and requiring washing to break it up, the combination with such a tank of means to admit wash water to the bottom of the tank and to draw it off at the top, an internal member adapted to be positioned in the treating granular material and to rise therewith after caking thereof upon admission of wash water therebelow, a water-tight glass extension positioned upon the top of the tank and opening thereinto, an extension from said internal member leading to the said glass member and adapted to move therein, said internal member and the extension thereof being adapted to rise with said granular material when caked and when a flow of wash water is admitted below the cake and to descend when the caked material again becomes granular, whereby to indicate the position of said treating material.

3. In apparatus adapted to treat water by passage through a mass of treating material contained in a tank, said treating material being normally granular but adapted to become caked by use and requiring washing to break it up, the combination with such a tank of means to admit wash water to the bottom of the tank and to draw it off at the top, an internal member adapted to be positioned in the treating material and to rise with the caked material upon admission of wash water therebelow, an external visible member adapted to rise with said internal member, a glass case surrounding the external visible member to prevent escape of water from the tank, and an electric circuit adapted to be closed by the external member when the internal member is in its lowermost position.

In testimony whereof, I have hereunto set my hand.

ANDREW J. DOTTERWEICH.